United States Patent [19]

De Rooij

[11] 3,852,273

[45] Dec. 3, 1974

[54] PROCESS FOR PREPARING AND RECOVERING LACTAMS

[75] Inventor: Abraham H. De Rooij, Geleen, Netherlands

[73] Assignee: Stamicarbon N.V., Heerlen, Netherlands

[22] Filed: May 2, 1972

[21] Appl. No.: 249,727

[30] Foreign Application Priority Data
May 7, 1971 Netherlands.................... 7106341
Nov. 3, 1971 Netherlands.................... 7115110

[52] U.S. Cl............ 260/239.3 A, 260/293.86, 260/326.5 FN
[51] Int. Cl........................................... C07d 41/06
[58] Field of Search ..... 260/239.3 A; 423/356, 387, 423/525, 530, 541

[56] References Cited
UNITED STATES PATENTS

| 3,133,055 | 5/1964 | Grulet et al.............. | 260/239.3 A |
| 3,275,407 | 9/1966 | Furkert et al............. | 423/356 |
| 3,292,996 | 12/1966 | Furkert et al............. | 423/356 |
| 3,321,275 | 5/1967 | Furkert et al............. | 423/356 |
| 3,336,298 | 8/1967 | De Rooij.................. | 260/239.3 A |
| 3,383,170 | 5/1968 | Furkert et al............. | 423/541 |
| 3,404,947 | 10/1968 | Miller...................... | 260/465.3 |
| 3,694,433 | 9/1972 | Beckham.................. | 260/239.3 A |

FOREIGN PATENTS OR APPLICATIONS
1,206,404 7/1966 Germany
1,999,243 7/1963 Germany

OTHER PUBLICATIONS

Mellor, "Comprehensive Treatise on Inorganic and Theoretical Chemistry," Vol. 2, page 203 (Longmans, Green) (1922).
Seel, "Fortschr. Chem. Forsch," Vol. 4, pages 301–332 (1963).

Primary Examiner—Henry R. Jiles
Assistant Examiner—Robert T. Bond
Attorney, Agent, or Firm—Cushman, Darby & Cushman

[57] ABSTRACT

A process for preparing and recovering lactams by the so-called Beckmann rearrangement of the corresponding ketoximes in a sulfuric acid medium is disclosed, wherein the mixture of lactam and sulfuric acid medium obtained from the Beckmann rearrangement is mixed with an aqueous solution of ammonium sulfate obtained as a by-product in the synthesis of hydroxylammonium sulfate in the preparation of said ketoximes. The lactam is then extracted from the resulting less acidic solution and the remaining acid solution, comprising an aqueous solution of ammonium hydrogen sulfate, is thermally decomposed to produce recoverable sulphur dioxide.

The process of this invention can be used in the production of lactams while avoiding the production of ammonium sulfate by-product.

5 Claims, 2 Drawing Figures

PROCESS FOR PREPARING AND RECOVERING LACTAMS

BACKGROUND OF THE PRESENT INVENTION

The present invention relates to the preparation of lactams, particularly ε-caprolactam, from the corresponding ketoximes, with recovery of the lactam product from the reaction medium.

It is known that lactams can be obtained from alicyclic ketones by intra-molecular rearrangement wherein rearrangement takes place in, and is catalyzed by, a highly acid medium. This process is known as the Beckmann rearrangement.

Prior art has taught that, besides sulfuric acid, other acid media may be used as the highly acid medium for the Beckmann rearrangement, including phosphoric acid, mixtures of acetic acid and acetic anhydride, and melts of ammonium hydrogen sulfate. However, in commercial practice of the rearrangement of cyclohexanone oxime to ε-caprolactam, which is the most important of the lactams now produced, about 6 percent by weight oleum is normally used as the highly acid medium, generally in a ratio of 1 mole of dry oxime to 1.5 moles of sulfuric acid. Any traces of moisture present in the oxime which is to be rearranged are removed by the free $SO_3$ of the oleum. Rearrangement of cyclohexanone oxime takes place in the oleum at about 125°C, to produce ε-caprolactam in a fast, continuous manner with very high process efficiencies.

The above process for the production of ε-caprolactam and other lactams has a disadvantage in that the process involves considerable production of ammonium sulfate as a by-product. In order to be able to separate the lactam product from the sulfuric acid reaction medium, the prior art has neutralized the reaction medium with ammonia water to a pH of about 4.5, whereby a two-phase system is obtained, with a layer mainly consisting of lactam floating in an ammonium sulfate solution containing about 40 percent by weight of ammonium sulfate and only minor amounts of lactam. The separation of the two layers can be readily effected, and lactam can be recovered from each of the layers by extraction. In this recovery process, the sulfuric acid or oleum used in the Beckmann rearrangement is fully converted into ammonium sulfate, with about 1.7 – 1.9 tons of ammonium sulfate by-product being produced for every ton of ε-caprolactam produced.

In addition to the above, it is necessary to consider that, in the preparation of lactams, ketoximes are generally one of the starting materials, and these ketoximes are generally obtained by reacting the corresponding ketone with hydroxyl ammonium sulfate. In commercial practice, the hydroxyl ammonium sulfate is normally obtained by the so-called Raschig synthesis, which is based on a reduction of ammonium nitrite with sulphur dioxide in a solution containing ammonium hydrogen sulfite, with the ammonium salt of hydroxylamine disulfonic acid being formed as an intermediate product. A solution of hydroxyl ammonium sulfate and ammonium sulfate is obtained by hydrolysis of the above intermediate product and neutralization with ammonium.

The solution of hydroxyl ammonium sulfate and ammonium sulfate so obtained is reacted with a ketone, such as, e.g., cyclohexanone, to produce, in addition to the desired oxime, e.g., cyclohexanone oxime, an ammonium sulfate solution having a concentration of about 40 percent by weight. This solution can be subjected to evaporative concentration to yield 2.5–2.7 tons of ammonium sulfate by-product for every ton of ε-caprolactam produced. This results in the total by-production of ammonium sulfate, considering the 1.7–1.9 tons of ammonium sulfate produced in the oxime rearrangement step, of a total of 4.2–4.6 tons of ammonium sulfate by-product for every ton of ε-caprolactam product.

This ammonium sulfate recovered as a by-product may be used as a fertilizer in tropical and subtropical regions, but the prospects of profitable sales are discouraging as a result of falling sales prices, particularly when considered in relation to the high cost of transportation of ammonium sulfate to these tropical or subtropical regions from more temperate zones.

DESCRIPTION OF THE INVENTION

The present invention provides a Beckmann rearrangement process for the production of lactams without the by-production of ammonium sulfate as a final product, as the solutions of ammonium sulfate obtained as by-products in the various process steps are subjected to combustion, with recovery of sulfur dioxide. The sulfur dioxide recovered is, in turn, used to satisfy the requirement therefor of the Raschig process for the preparation of hydroxylammonium sulfate, as well as the $SO_2$ requirement for the oleum used in the Beckmann rearrangement.

In the process described hereinabove, wherein ketones are reacted with hydroxylammonium sulfate to produce ketoximes, which ketoximes are used in the Beckmann rearrangement to produce the corresponding lactams with recovery of the lactam from the Beckmann rearrangement reaction medium, the mixture of lactam and sulfuric acid reaction medium obtained from the Beckmann rearrangement is made less acidic by the addition of the ammonium sulfate solution obtained as a by-product in the Raschig hydroxylamine synthesis and in the oxime synthesis from the corresponding ketones. The lactam can be recovered from the partially neutralized mixture by extraction with a water-immiscible organic solvent for the lactam. The neutralized mixture is substantially a solution of lactam and ammonium hydrogen sulfate in water, although the solution may contain some ammonium sulfate. After the lactam is recovered from the mixture by extraction, the remaining ammonium hydrogen sulfate and ammonium sulfate solution is of a sufficiently high concentration so as to allow sulphur dioxide to be economically recovered therefrom by conventional combustion operations.

The separation of lactam by extraction from the lactam-sulphuric acid reaction mixture, possibly after dilution and neutralization of such mixture, has been previously proposed. The lactam is extracted with organic solvents, with the choice of the organic solvent generally depending upon the pH value of the mixture which is to be extracted, as known to the art. Reaction mixtures having reduced acidity are generally extracted with aromatic hydrocarbons of six to eight carbon atoms, such as, for instance, benzene and toluene, whereas for reaction mixtures which are still highly acid, for instance, having a pH value of about 1 or lower, chlorinated hydrocarbons, especially chlorinated alkanes of one to three carbon atoms, such as, for instance, chloroform, 1,2-dichloroethane, and 1,1,2,2-tetrachloroethane, are preferred.

The prior art has also proposed for the lactam to be separated from a mixture of lactam and sulphuric acid reaction medium, with the pH value of the mixture being raised prior to the extraction by the addition of ammonium sulphate and water such that the molar ratio of $(NH_4)_2SO_4$ to $H_2SO_4$ is about 0.75:1. Prior art has never suggested that the ammonium sulphate solutions produced in the hydroxylamine synthesis and in the oximation step be used to lower the acidity of the Beckmann rearrangement mixture of lactam and sulphuric acid. However, these ammonium sulphate solutions are particularly suitable for such treatment of lowering the acidity of the reaction mixture because, among other reasons, the solutions contain just enough water to form a solution after having been mixed with the Beckmann rearrangement mixture of lactam and sulphuric acid, and the addition of extra water to maintain the whole mixture in solution is unnecessary.

The process of the present invention is more economical than is the process wherein all of the ammonium sulphate solutions obtained as by-products in the various process steps, including hydroxylamine preparation, the oximation step, the Beckmann rearrangement step, and the lactam recovery step, are directly subjected to combustion, with recovery of sulphur dioxide. In the process of the present invention a maximum of 4.4 moles of $NH_3$ are used for every mole of ε-caprolactam produced, which $NH_3$ is recovered in the form of a 50–60 weight-percent solution of ammonium sulphate and ammonium hydrogen sulphate, with $SO_2$ recovered from such solutions by combustion.

In comparison, the prior art process described hereinabove in the section entitled "Background of the Invention," 7.4 moles of $NH_3$ will be used per mole of ε-caprolactam produced, which $NH_3$ is recovered in the form of a 40 weight-percent solution of ammonium sulphate, from which either $SO_2$ can be recovered by combustion, or ammonium sulphate can be recovered by evaporation and crystallization.

DESCRIPTION OF THE DRAWINGS

The invention will be more readily understood with reference to the accompanying drawings wherein:

In FIG. 1, A represents a hydroxylamine synthesis zone, B represents an oximation zone, C represent an oleum synthesis zone, D represents a Beckmann rearrangement zone, E represents a mixing zone, F represents an extraction column or zone, G represents a combustion zone for th thermal decomposition of sulphate-containing solutions, and H represents a washing zone to remove water vapor from $SO_2$ gas.

Figure 1:
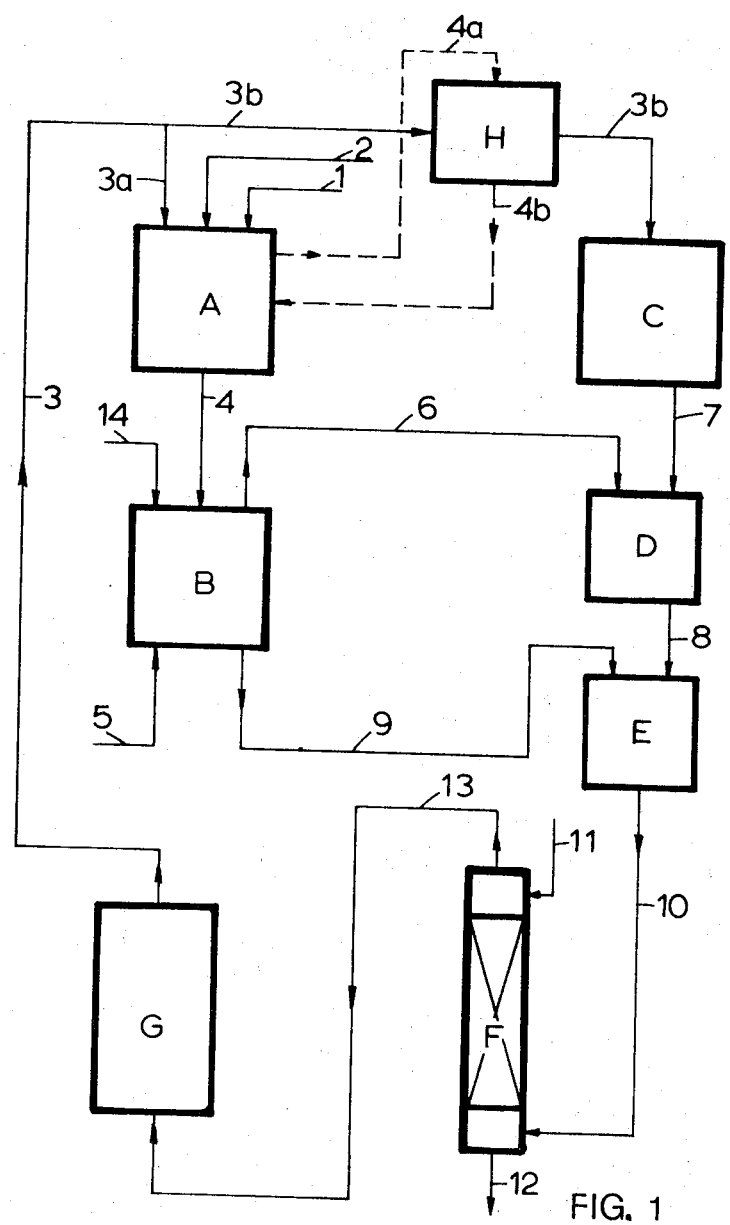
FIG. 1 is a schematic flow diagram of the process of the present invention.

The hydroxylamine synthesis zone A is supplied with ammonia, a solution of ammonium nitrite, and sulphur dioxide through lines 1, 2, and 3a, respectively. These materials are reacted at a temperature of about −10° to about +10°C, preferably about 0°C, to produce a solution of the ammonium salt of hydroxylamine disulphonic acid, according to the reaction equation:

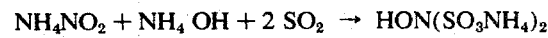

The above reaction is conveniently conducted at atmospheric pressure, although higher or lower pressures may be used if desired. The reactants are preferably in about stoichiometric quantities, although about 1.9 to 2.5 moles of ammonia and about 1.9 to about 2.4 moles of sulphur dioxide may be used per mole of ammonium nitrite.

The solution of the ammonium salt of hydroxylamine disulphonic acid obtained in hydroxylamine synthesis zone A is then heated to a temperature of about 60° to about 105°C, preferably about 100° to 105°C, whereupon the ammonium salt of hydroxylamine disulphonic acid is hydrolyzed to a solution of hydroxylammonium-ammonium sulphate and ammonium hydrogen sulphate, according to the reaction equations:

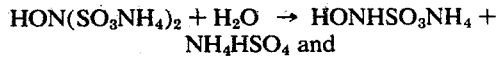

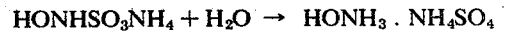

The above solution is neutralized with ammonia, generally to a pH of about 3 to 5, and then this hydroxylammonium sulphate containing solution is supplied through line 4 to oximation zone B, wherein the hydroxylammonium sulphate reacts with a ketone supplied through line 5 to form the corresponding oxime. The reaction conditions for this oximation zone are conventional, e.g., temperatures of about 80° to 90°C, atmospheric pressure, although higher and lower pressures may be used, and a molar ratio of about 1 to about 1.1 moles of hydroxylammonium sulphate per mole of ketone. Generally, this reaction is conducted at a pH of 3 to 6, and the pH can be controlled within this range by the introduction of ammonia water through line 14. The oxime formed in oximation zone B is separated from the ammonium sulphate solution produced in the oximation reaction. The oxime formed in the oximation zone B is supplied to the Beckmann rearrangement zone D via line 6. Beckmann rearrangement zone D is also supplied with oleum from the oleum synthesis zone C through line 7. The reaction conditions in the Beckmann rearrangement zone are conventional, see, e.g. U.S. Pat. No. 2,487,246, the disclosure of which is hereby incorporated by reference.

The Beckmann rearrangement in zone D produces a mixture of lactam and sulphuric acid, which flows from zone D to mixing zone E through line 8. This mixture of lactam and sulphuric acid is mixed at ambient conditions in mixing zone E with a solution of ammonium sulphate supplied through line 9 from oximation zone B.

A solution of lactam, ammonium sulphate and sulphuric acid is produced in mixing zone E, and this solution is fed through line 10 to extraction zone F, wherein the solution is countercurrently extracted with a water immiscible extraction solvent for the lactam supplied through line 11. The extraction solvent is generally present in an amount of from 1.5 to 10 moles, per mole of lactam, and may be present in much greater amounts, although large excesses only result in higher process costs with no advantages accuring therefrom. The extraction is generally at a temperature of about 20° to 50°C, and normally at atmospheric pressures, although higher or lower pressures may be used if desired. A solution of lactam in the organic extraction solvent is discharged from extraction zone F through line 12 to a separation zone (not shown) wherein product lactam is recovered by evaporation of the extraction solvent and/or by washing with water, whereupon the extraction solvent is returned to extraction zone F through line 11.

The aqueous solution of ammonium sulphate and sulphuric acid, containing essentially no lactam, passing out the top of extraction zone F is led through line 13 to combustion zone G, wherein thermal decomposition takes place at elevated temperatures, generally above 500°C, and preferably about 1,000°C, wherein the sulphur previously bound in the sulphate radical is liberated in the form of sulphur dioxide. This sulphur dioxide gas is recirculated through line 3 and to lines 3a and 3b, to the hydroxylamine synthesis zone A and the oleum synthesis zone C, respectively. The thermal decomposition in combustion zone G can be effected in conventional ways, for instance, by spraying the solution of ammonium sulphate and sulphuric acid into a natural gas flame to produce a gas whose principal constituents are $N_2$, $SO_2$, and $H_2O$, with the gas having a temperature of about 1,000°C.

This gas is cooled, generally first in a heat exchanger, with the production of steam, and thereafter in a cooling water tower or cooler, and a major portion of the water vapor originally present in the gas will condesne. If the gas is cooled to about 30°C, a gas stream will be obtained which contains $SO_2$ and $N_2$, as well as some remaining water vapor. To utilize a cyclic process wherein sulphuric acid is neither supplied to nor discharged from the process, it is necessary to prepare oleum for the Beckmann rearrangement. For the preparation of oleum, it is necessary that the sulphur dioxide-containing gas stream have a molar ratio of $SO_2$ to $H_2O$ which is larger than 1:1, and preferably larger than 1.5:1. A $SO_2$-containing gas having such a low water content can be simply obtained by washing the gas which is supplied through line 3b to the oleum preparation zone C in a washing zone H with the washing agent being the solution of the ammonium salt of the hydroxylamine disulphonic acid which is formed as an intermediate product in hydroxylamine synthesis zone A. This solution, which normally has a temperature of about 0°C, is supplied to washing zone H through line 4a and returned to hydroxylamine synthesis zone A through line 4b. In its contact with the $SO_2$-containing gas in washing zone H, this solution will be heated to about 25°C, while water vapor condenses out of the gas which is being washed, resulting in a washed gas wherein the $SO_2$ to $H_2O$ molar ratio is increased to the value required for oleum preparation in oleum synthesis zone C.

It is also possible to reduce the water content of the $SO_2$-containing gas by direct cooling of the $SO_2$-containing gas stream from combustion zone G with another suitable process stream such as, e.g., the concentrated solution of ammonium sulphate and sulphuric acid discharged from extraction zone B through line 13 after lactam has been removed therefrom by extraction.

The solutions containing ammonium sulphate and sulphuric acid produced in mixing zone E will normally have a molar ratio of ammonium sulphate to the sum of ammonium sulphate and free sulphuric acid of about 0.5, i.e., about that of ammonium hydrogen sulphate, although minor deviations from this ratio are possible. For instance, in practice, the lactam will normally be extracted from solutions wherein the molar ratio of ammonium sulphate to the sum of ammonium sulphate and sulphuric acid varies from 0.45 : 1 to 0.63 : 1. For convenience in the present specification and the claims, the solutions will be simply indicated as ammonium hydrogen sulphate solutions.

Figure 2:
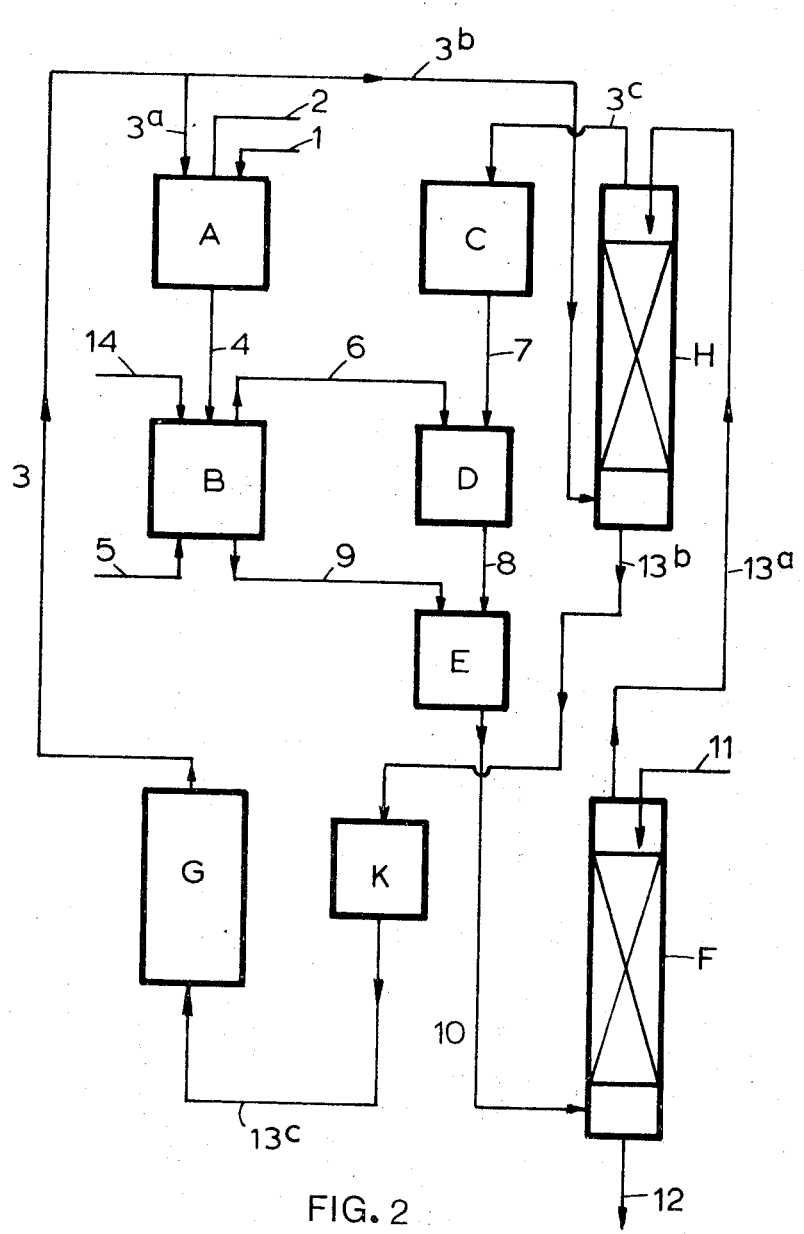
FIG. 2 is a schematic flow diagram representing another, and preferred, embodiment of the process of the present invention.

Another embodiment of the present process is illustrated in FIG. 2, which generally corresponds to the process of FIG. 1. However, in FIG. 2 the $SO_2$ supplied to the oleum preparation zone C through line 3b is washed in washing zone H with the aqueous solution of ammonium hydrogen sulphate discharged from extraction zone F. This solution, which normally has a temperature of about 20°C, is supplied to washing zone H through line 13a. In its contact with the $SO_2$ containing gas which is to be washed, this solution will be heated to about 30°C while water vapor condenses out of the washed gas, whereby the molar ratio of $SO_2$ to $H_2O$ in the washed gas is increased to the required value for oleum preparation in oleum synthesis zone C. The ammonium hydrogen sulphate solution used in washing zone H is supplied to combustion zone G through line 13b, evaporator K, and line 13c. In evaporator K the ammonium hydrogen sulphate solution will normally be concentrated to a concentration of at least 50 weight-percent of ammonium hydrogen sulphate.

When the process described above for FIG. 2 is used in a caprolactam plant having an annual production of 100,000 tons, an $SO_2$-containing gas obtained through combustion in a natural gas flame of an ammonium hydrogen sulphate solution concentrated to about 80 percent by weight, which gas contains about 5.5 volume percent $H_2O$ and 6.8 volume percent $SO_2$, will be washed in washing column H with 99,000 kg of lactam-free ammonium hydrogen sulphate solution produced in extraction zone F. During the washing step, the ammonium hydrogen sulphate solution will be heated from 20° to 30°C. The $SO_2$-containing gas stream, having a flow rate of 57,000 m cube per hour (STP) and a temperature of 35°C, and be cooled to 30°C, with the condensation of about 690 kg of water vapor. The composition of the resulting gas will be as follows:

| | |
|---|---|
| $SO_2$ | 6.9 vol.-% |
| $H_2O$ | 4.1 vol.-% |
| $O_2$ | 6.8 vol.-% |
| $CO_2$ | 5.3 vol.-% |
| $N_2$ | 76.9 vol.-% |

This gas may be processed in oleum synthesis zone C to form oleum containing as much as 20 percent free $SO_3$. When oleum having such a high concentration of free $SO_3$ is used, cyclohexanone oxime which has not been predried, and which has a moisture content of about 5–6 weight-percent, can still be readily converted into caprolactam.

EXAMPLES OF THE INVENTION

In the following examples, which are presented to illustrate but not limit the invention, ε-caprolactam was produced from cyclohexanone. The compositions of the principal process flows of the examples are given, in the form of tables, wherein the process flow numbers correspond to the flow streams or lines of the accompanying figures.

Example 1

In this example the final oximation takes place at a pH of 4.5, so that the pH of the solution of ammonium sulphate in line 9 is 4.5, corresponding to a molar ratio of ammonium sulphate to the sum of ammonium sulphate plus sulphuric acid of 1 : 1.

A solution containing about 11.3 percent by weight of lactam was extracted in extraction zone F with chloroform, with a 30 percent by weight solution of lactam in chloroform discharged through line 12, and a 51 percent by weight solution of sulphuric acid and ammonium sulphate discharged through line 13 to combustion zone G. The Beckmann rearrangement in Beckmann rearrangement zone D was conducted at a temperature of about 125°C and mixing zone E was maintained at a temperature of about 30°C and atmospheric pressure. The extraction column (extraction zone F) was maintained at atmospheric pressure and a temperature of 30°C. The gas in line 3, at a temperature of about 1,000°C after combustion in a natural gas flame in combustion zone G, contained 370 moles of $SO_2$ and 2,000 moles of water. 50 moles of the ammonium salt of hydroxylamine disulphonic acid were supplied to washing zone H through line 4a at a temperature of 0°C. Cyclohexanone oxime was produced in oximation zone B at 85°C and atmospheric pressure.

The molar compositions of the principal process flows are set forth in the table below.

The process of this example, using the apparatus described in FIG. 2, used a smaller amount of $NH_3$ and a smaller quantity of fuel in the thermal decomposition of more concentrated solution of ammonium sulphate and sulphuric acid than the process of Example 1, which corresponded to FIG. 1 of the accompanying drawings. For this reason, the process of Example 2 is preferred over that of Example 1 for economic reasons.

The Beckmann rearrangement in Beckmann rearrangement zone D was conducted at a temperature of about 125°C and a pressure of 1 atmosphere. 150 moles of 6 percent by weight oleum were introduced through line 7 into Beckmann rearrangement zone D.

Mixing zone E was maintained at a temperature of 30°C and atmospheric pressure. The extraction column (extraction zone F) was maintained at atmospheric pressure and a temperature of 30°C. 185 moles of ammonium sulphate, 185 moles of sulphuric acid, and 1,840 moles of water were introduced into evaporator K through line 13b. In evaporator K the liquid was heated by a submerged burner, the evaporator operated at a pressure of 1 atmosphere and a temperature of 110°C and concentrated the ammonium sulphate/sulphuric acid solution to a concentration of 80 percent by weight. This concentrated solution was consumed in a natural gas flame in combustion zone G, producing a gas, which contained 370 moles of $SO_2$ and 2,000 moles of water, having a temperature of 1,000°C. After cooling 60 percent of this gas stream was supplied to

TABLE I

| process flow no. | $H_2SO_4$ | $(NH_2OH)_2 \cdot (NH_4)_2SO_4 \cdot H_2SO_4$ | $NH_4NO_3$ | $H_2O$ | $NH_3$ | Cyclohexanone | oxime | caprolactam | chloroform |
|---|---|---|---|---|---|---|---|---|---|
| 4  | 60  | 50  | 110 | 15 | 1200 |     |     |     |     |
| 14 |     |     |     |    | 1140 | 220 |     |     |     |
| 5  |     |     |     |    |      |     | 100 |     |     |
| 6  |     |     |     |    | 20   |     |     | 100 |     |
| 8  | 150 |     |     |    |      |     |     |     | 100 |
| 9  |     |     | 220 | 15 | 2420 |     |     |     |     |
| 10 | 150 |     | 220 | 15 | 2420 |     | 100 |     |     |
| 11 |     |     |     |    |      |     |     |     | 220 |
| 12 |     |     |     |    |      |     |     | 100 | 220 |
| 13 | 150 |     | 220 | 15 | 2420 |     |     |     |     |

Example 2

In this example, the oximation is conducted in a counter-current manner, at a pH of 1.5, corresponding to a molar ratio of

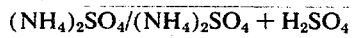

$$(NH_4)_2SO_4/(NH_4)_2SO_4 + H_2SO_4$$

in the resulting ammonium sulphate solution of 0.84:1.

A solution containing 13 percent by weight of lactam was extracted in extraction zone F with chloroform, with a 10 percent by weight solution of lactam in chloroform discharged through line 12, and a 56 percent by weight solution of sulphuric acid and ammonium sulphate discharged through line 13a to washing zone H. The lactam solution fed to extraction zone F through line 10 contained less water as a result of different oximation conditions than the similar solution in Example 1, but a larger amount of chloroform extraction solvent was required because of the higher acidity, which has an unfavorable influence on the distribution coefficient of the lactam in the extraction step.

hydroxylamine synthesis zone A through line 3a. The remainder of the gas stream was supplied to washing zone H through line 3b. Washing zone H was operated at atmospheric pressure, and the exit ammonium hydrogen sulphate solution had a temperature of 30°C and the exit gases had a temperature of 30°C. 150 moles of $SO_2$ and 100 moles of water were introduced into oleum synthesis zone C through line 3c, and 150 moles of 6 percent oleum were produced in oleum synthesis zone C at a temperature of 30°C and a pressure of 1 atmospheres and supplied to Beckmann rearrangement zone D through line 7. 220 moles of $NH_3$ and 100 moles of $NH_4NO_2$ were supplied to hydroxylamine synthesis zone A through lines 1 and 2 respectively. The hydroxylamine synthesis zone A was operated at 0°C, in the first stage (formation of the ammonium salt of hydroxylamine disulphonic acid) and a temperature of 105°C in the second stage, and at a pressure of 1 atmospheres. Oximation zone B was operated at a temperature of 80°C and a pressure of 1 atmospheres. The molar compositions of the principal process flows are set forth in the table below:

TABLE II

Compositions of the flows, in moles

| process flow no. | H₂SO₄ | (NH₂OH)₂·H₂SO₄ | (NH₄)₂SO₄ | NH₄NO₃ | H₂O | NH₃ | cyclo-hexanone | oxime | capro-lactam | chloro-form |
|---|---|---|---|---|---|---|---|---|---|---|
| 4  | 60  | 50 | 110 | 15 | 1200 |     |     |     |     |     |
| 14 |     |    |     |    | 560  | 150 |     |     |     |     |
| 5  |     |    |     |    |      |     | 100 |     |     |     |
| 6  |     |    |     |    | 20   |     |     | 100 |     |     |
| 8  | 150 |    |     |    |      |     |     |     | 100 |     |
| 9  | 35  |    | 185 | 15 | 1840 |     |     |     |     |     |
| 10 | 185 |    | 185 | 15 | 1840 |     |     |     | 100 |     |
| 11 |     |    |     |    |      |     |     |     |     | 850 |
| 12 |     |    |     |    |      |     |     |     | 100 | 850 |
| 13 | 185 |    | 185 | 15 | 1840 |     |     |     |     |     |

What is claimed is:

1. A process for preparing lactams without requiring the substantial addition or discharge of sulphuric acid or other sulfur-containing compounds to the process, said process comprising the following steps:
    a. reacting a first amount of $SO_2$, ammonium hydroxide and ammonium nitrite to form a solution of ammonium hydrogen sulfate and hydroxylammonium sulfate,
    b. neutralizing the reaction mixture in step (a) above with ammonia to form a solution of ammonium sulfate and hydroxylammonium sulfate,
    c. reacting the neutralized product obtained in step (b) with a ketone and additional ammonia to produce the corresponding ketoxime and a solution of ammonium sulfate,
    d. separating the ketoxime from the ammonium sulfate solution of step (c),
    e. making oleum from a second amount of $SO_2$,
    f. subjecting the oxime separated in step (d) to the Beckmann rearrangement with the oleum of step (e) to produce a solution of lactam and sulfuric acid,
    g. partially neutralizing the sulphuric acid in the solution obtained in step (f) with the ammonium sulfate solution obtained in step (d), wherein the ratio of ammonium sulfate to the sum of ammonium sulfate and sulphuric acid is about 0.45:1 to about 0.63:1, to produce a solution of lactam in ammonium hydrogen sulfate,
    h. separating the reaction product of step (g) into lactam product and a solution of ammonium hydrogen sulfate,
    i. thermally decomposing the solution of ammonium hydrogen sulfate in step (h) to produce $SO_2$ in an amount which is substantially the sum of said first amount and said second amount,
    j. recycling said first amount of $SO_2$ to step (a), and
    k. recycling said second amount of $SO_2$ to step (e).

2. Process according to claim 1, wherein said ketone is cyclohexanone and said lactam is caprolactam.

3. Process according to claim 1 wherein a portion of the gas containing sulphur dioxide is cooled, with water vapor condensation, and then washed with a solution of the hydroxylamine disulphonic acid intermediate product from the hydroxylammonium sulphate synthesis, and thereafter the resulting gas having a molar ratio of $SO_2:H_2O$ greater than 1:1 is utilized for the preparation of sulphuric acid or oleum for the Beckmann rearrangement.

4. Process according to claim 1 wherein a part of said gas is, after cooling with water vapor condensation, washed, with water vapor condensation, with a solution of ammonium hydrogen sulphate, to produce a gas having a molar ratio of $SO_2:H_2O$ greater than 1:1, which is used to prepare oleum or sulphuric acid.

5. The process according to claim 4 wherein said molar ratio is at least 1.5:1.

* * * * *